(12) United States Patent
Kobayashi et al.

(10) Patent No.: US 8,533,376 B1
(45) Date of Patent: Sep. 10, 2013

(54) DATA PROCESSING METHOD, DATA PROCESSING APPARATUS AND ROBOT

(75) Inventors: Hiroya Kobayashi, Fukuoka (JP); Keiichi Takaoka, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 172 days.

(21) Appl. No.: 13/189,473

(22) Filed: Jul. 22, 2011

(51) Int. Cl.
*G06F 13/00* (2006.01)
*G06F 3/00* (2006.01)

(52) U.S. Cl.
USPC ............ 710/72; 710/2; 710/5; 710/8; 710/15; 710/62

(58) Field of Classification Search
None
See application file for complete search history.

(56) References Cited

U.S. PATENT DOCUMENTS

2006/0236063 A1* 10/2006 Hausauer et al. ............. 711/170

* cited by examiner

*Primary Examiner* — Scott Sun
(74) *Attorney, Agent, or Firm* — Ditthavong Mori & Steiner, P.C.

(57) ABSTRACT

A data processing method includes generating a data storing area in a memory space. An area address of the data storing area is designated to a basic I/O control on the user space in a memory. The memory has a user space and a kernel space. A function is called in the kernel space using the basic I/O control. Whether the data storing area is inside the memory space is determined. The area address of the data storing area is set as an argument of the function in a case where it is determined that the data storing area is included in the memory space.

13 Claims, 4 Drawing Sheets

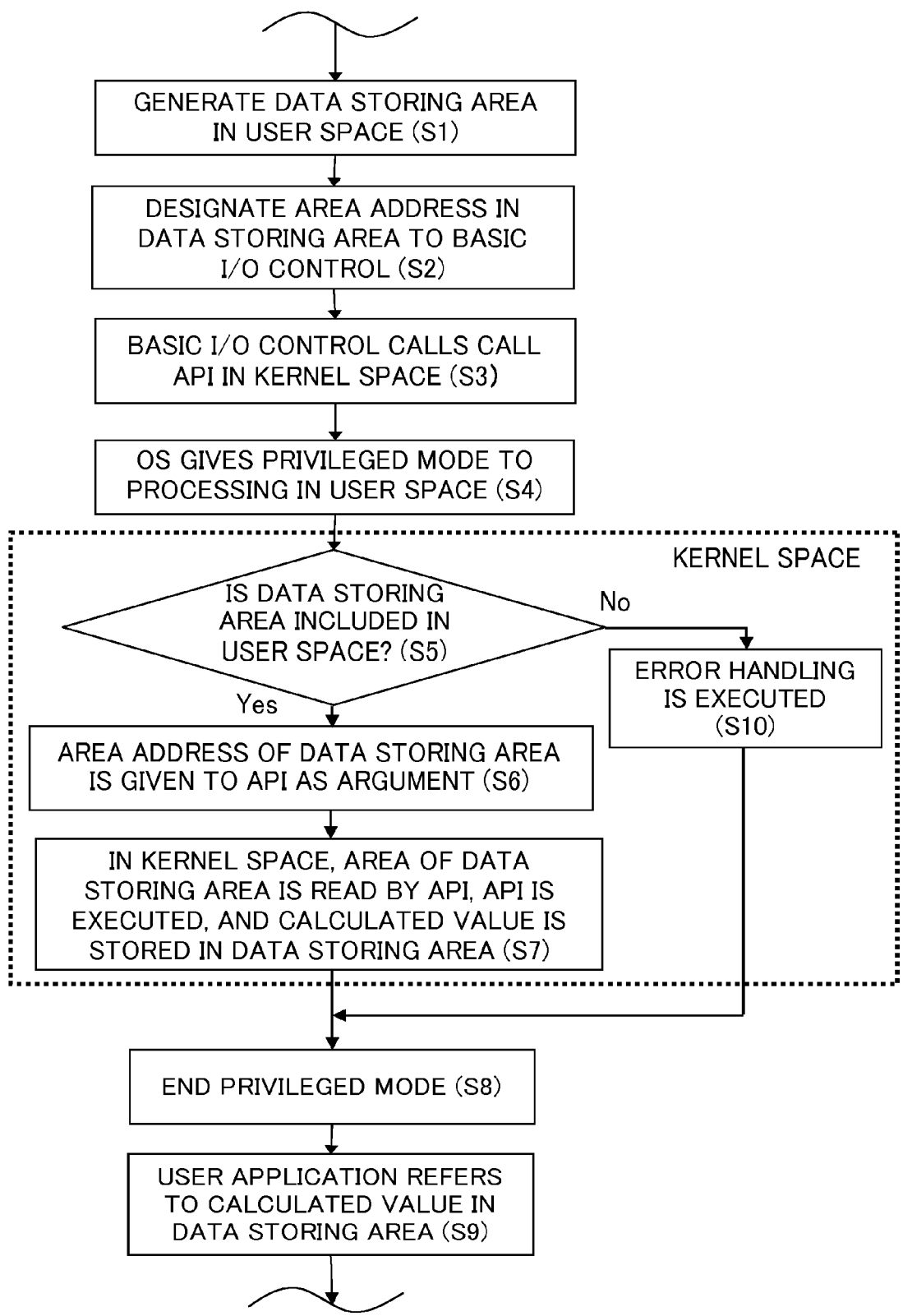

DATA PROCESSING METHOD, DATA PROCESSING APPARATUS AND ROBOT

BACKGROUND OF THE INVENTION

1. Field of the Invention

The present invention relates to a data processing method, a data processing apparatus and a robot.

2. Discussion of the Background

One aspect of an industrial robot has a robot body, a controller, and an input apparatus that are connected to each other. The controller generates control commands on the basis of operation designations input by the input apparatus, and the robot body operates on the basis of the control commands. The robot body has moving parts such as actuators and hinges, and each moving part is driven by a drive motor such as a servo motor.

SUMMARY OF THE INVENTION

According to one aspect of the present invention, a data processing method includes generating a data storing area in a memory space. An area address of the data storing area is designated to a basic I/O control on the user space in a memory. The memory has a user space and a kernel space. A function is called in the kernel space using the basic I/O control. Whether the data storing area is inside the memory space is determined. The area address of the data storing area is set as an argument of the function in a case where it is determined that the data storing area is included in the memory space.

According to another aspect of the present invention, a data processing apparatus includes a storing area generating device, an address designating device, a function calling device, a determining device and an argument setting device. The storing area generating device is configured to generate a data storing area in a memory space. The address designating device is configured to designate an area address of the data storing area to a basic I/O control on the user space in a memory. The memory has a user space and a kernel space. The function calling device is configured to call a function in the kernel space using the basic I/O control. The determining device is configured to determine whether the data storing area is inside the memory space. The argument setting device is configured to set the area address of the data storing area as an argument of the function in a case where it is determined that the data storing area is included in the memory space.

According to further aspect of the present invention, a robot includes a robot body, an input apparatus and a controller. The robot body includes a plurality of hinges and a plurality of drive motors to drive the plurality of hinges. The input apparatus includes an operation device configured to accept an input of an operation designation to operate the robot body. The controller includes a data processing apparatus. The data processing apparatus includes a storing area generating device, an address designating device, a function calling device, a determining device and an argument setting device. The storing area generating device is configured to generate a data storing area in a memory space. The address designating device is configured to designate an area address of the data storing area to a basic I/O control on a user space in a memory. The memory has the user space and a kernel space. The function calling device is configured to call a function in the kernel space using the basic I/O control. The determining device is configured to determine whether the data storing area is inside the memory space. The argument setting device is configured to set the area address of the data storing area as an argument of the function in a case where it is determined that the data storing area is included in the memory space.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a flow chart for explaining a data processing procedure in a memory in a robot according to the embodiment.

DESCRIPTION OF THE EMBODIMENTS

Figure 1:
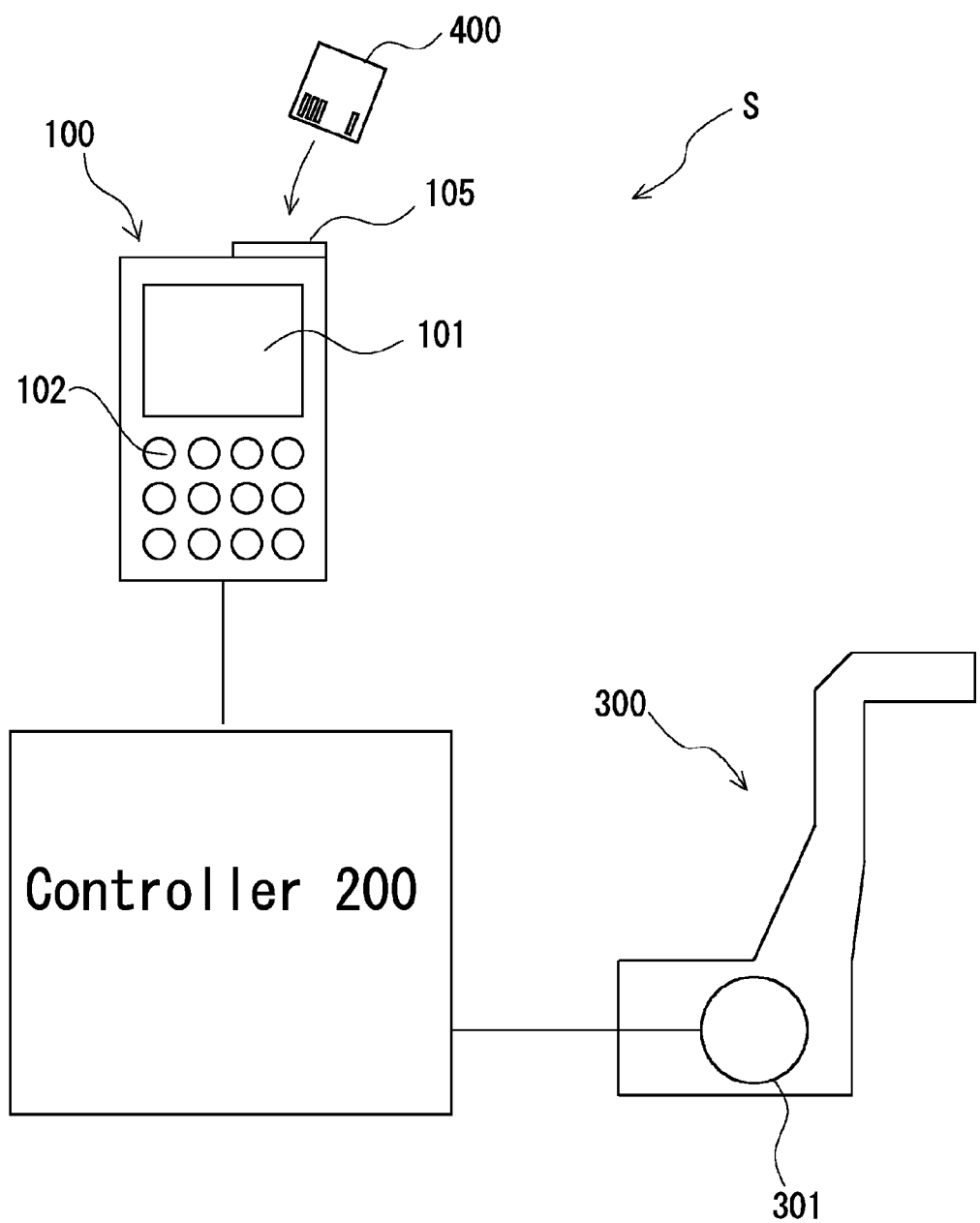
FIG. 1 is an entire block diagram of a robot according to an embodiment of the present invention.

The embodiments will now be described with reference to the accompanying drawings, wherein like reference numerals designate corresponding or identical elements throughout the various drawings. FIG. 1 is an entire block diagram of a robot S according to an embodiment of the present invention. The robot S is an industrial robot used in a welding operation for a production line in a factory. The robot S is roughly configured by a programming pendant (to be referred to as a pendant hereinafter) 100 serving as an input apparatus, a controller 200, and a robot body 300.

The pendant 100 has a display unit 101, operation buttons (operation device) 102, a CPU (not shown), and a memory (not shown). The operation buttons 102 are to accept input operations to operate the robot body 300 by a user. Input data input from the operation buttons 102 by the user is designed to be displayed on the display unit 101. The display unit 101 displays other various pieces of information. For example, the display unit displays an initial setting menu of the robot S or an operation designation menu of the robot body 300.

The CPU and the memory function as a computer. In the memory, the contents of a menu configuration displayed on the display unit 101, commands to designate an operation to the robot body 300, and the like are stored.

The CPU is a processor to perform various arithmetic processing, and is substantially connected to the controller 200 through a communication interface (not shown). For example, the CPU executes an arithmetic processing to display necessary information on the display unit 101 on the basis of an input from the operation buttons 102. For example, the CPU executes an arithmetic processing to send an operation designation to operate the robot body 300 to the controller 200. The pendant 100 and the controller 200 may be connected through an interface such as RS232C such that the pendant 100 and the controller 200 can serially communicate with each other. Some of the operation buttons 102 of the pendant 100 are allocated to an emergency stop switch (not shown) and enable switch (not shown). When these switches are operated, designation signals such as for the emergency stop or the enable operation are sent to the controller 200.

In the embodiment, the pendant 100 includes, for example, a memory slot (memory loading device) 105 for a flash memory such as a compact flash (registered trademark in the U.S.). When a flash memory 400 is loaded in the memory slot 105, it is possible to transmit data in the flash memory 400 to the controller 200.

The controller 200 is connected to the robot body 300 and the pendant 100. The controller 200 generates control commands for servo motors 301 on the basis of the operation designations from the pendant 100. The control commands are sent to the robot body 300.

Figure 2:
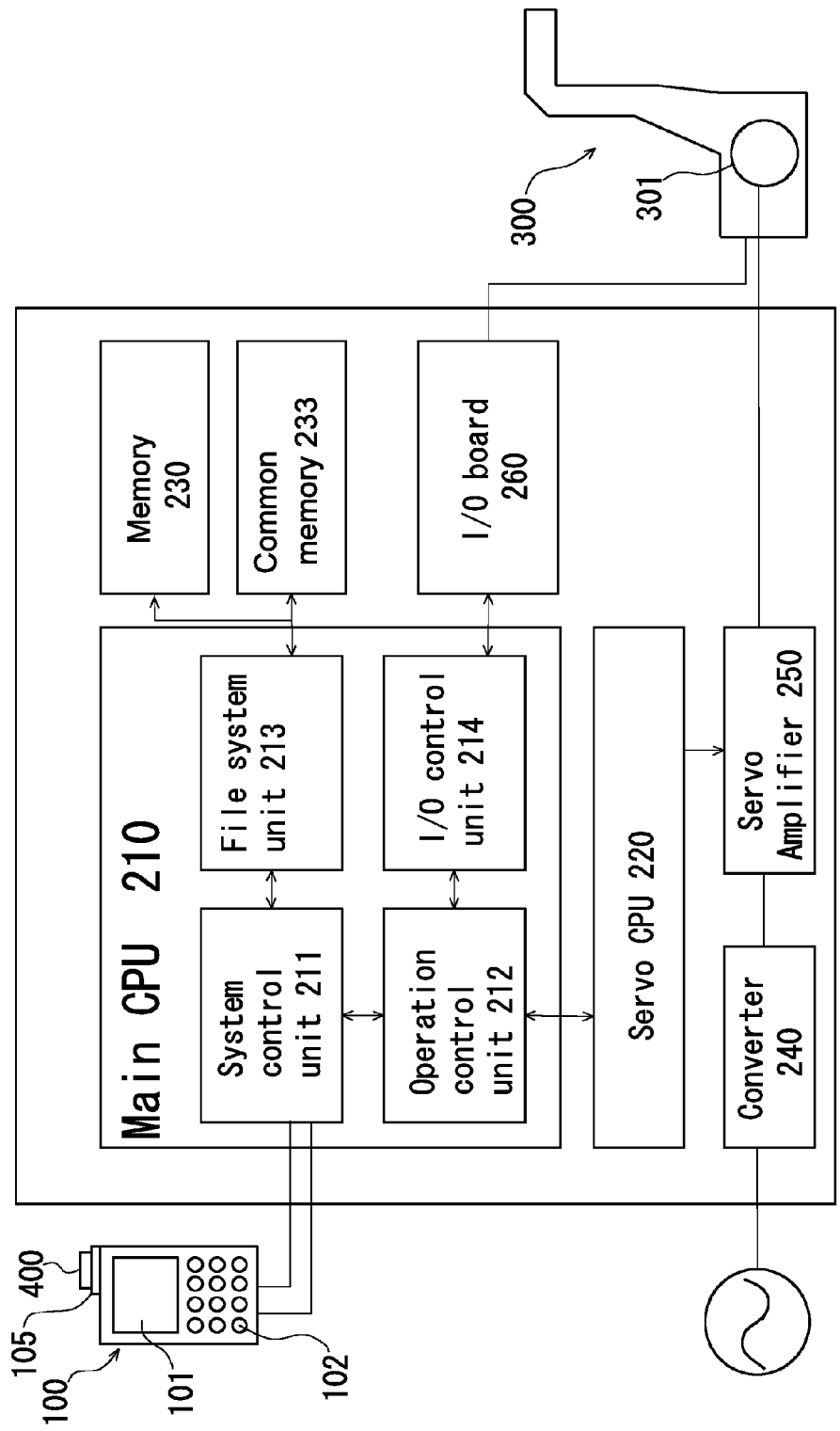
FIG. 2 is a block diagram showing an outline of an internal configuration of a controller.

FIG. 2 is a block diagram showing an outline of an internal configuration of the controller 200. The controller 200 has, therein, a main CPU 210, a servo CPU 220, a memory 230, a converter 240, servo amplifiers 250, and an I/O board 260.

The main CPU 210 is an arithmetic processing unit to execute input/output operations of various data and arithmetic processings. The main CPU 210 functions as, for example, a system control unit 211, an operation control unit 212, a file system unit 213, an I/O control unit 214 by various application programs such as a system program and an operation program.

In this case, the system control unit 211 exerts a function of integrating operation controls of the overall robot S. The operation control unit 212 exerts a function of executing operation control of the servo motors 301 on the robot body 300 on the basis of an operation designation (for example, an operation designation by an operation program) from the pendant 100. The operation control unit 212 has a function of executing operation control of the servo motors 301 on the robot body 300 on the basis of an operation designation by an application program (will be described later). The file system unit 213 exerts a function of executing data communication with the memory 230. The I/O control unit 214 exerts a function of controlling data input/output operations between the main CPU and various sensors and switches arranged on or around the robot body 300 through the I/O board 260.

The servo CPU 220 controls an operation of the servo motors 301 included in the robot body 300 on the basis of control commands from the main CPU 210. More specifically, for example, when the servo CPU 220 receives data (target positions, moving speed data, and the like of servo motors of hinges for each predetermined control cycle) required for an operation from the operation control unit 212 of the main CPU 210, the servo CPU 220 generates control signals required to drive the servo motors 301 on the basis of the data. On the basis of feedback signals from the servo motors 301, the servo CPU 220 also generates control signals to correct (feed back) the operation of the servo motors 301.

The converter 240 and the servo amplifiers 250 configure driver circuits of the servo motors 301. The converter 240 and the servo amplifiers 250, on the basis of the control signals from the servo CPU 220, generate drive signals (drive currents) to drive the servo motors 301 and send the drive signals to the servo motors 301.

The I/O board 260 is a relay board that can communicate with the I/O control unit 214 of the main CPU 210. The I/O board 260, for example, receives sensor signals from various sensors on the robot body 300. The received sensor signal is transmitted to the I/O control unit 214 of the main CPU 210.

The robot body 300 is, for example, a main part of an industrial robot, and is called a manipulator. For example, a plurality of arms are rotatably connected to the manipulator with hinges. The hinges are designed to be controllably rotated by the servo motors 301. A configuration of the robot body 300 will not be described in detail.

Figure 3:
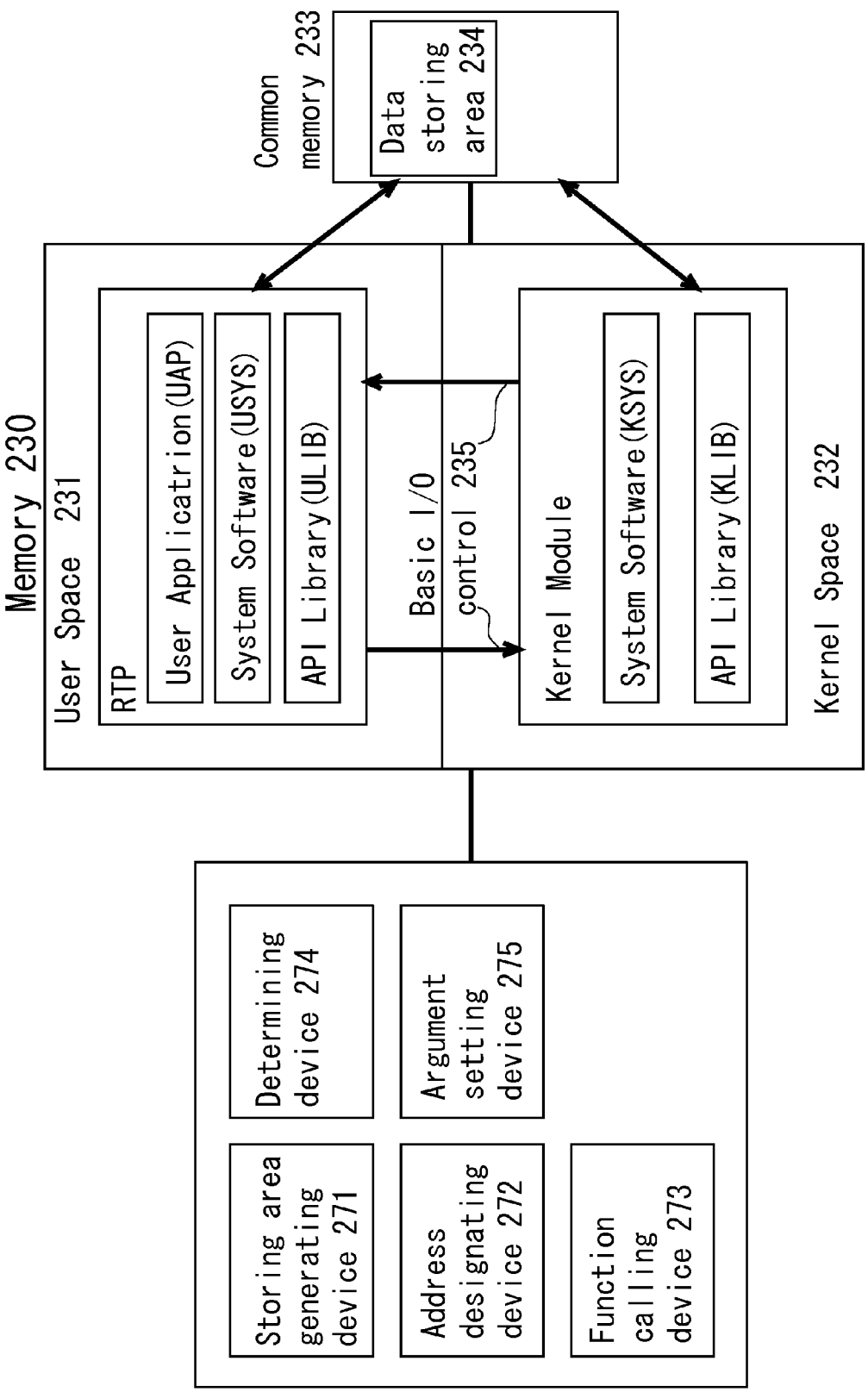
FIG. 3 is a block diagram typically showing internal configurations of a main CPU and a memory in a controller in units of functions related to data processing in the memory.

FIG. 3 is a block diagram typically showing internal configurations of the main CPU 210 and the memory 230 in the controller 200 in units of functions related to data processing in the memory.

The main CPU 210 exerts functions of a storing area generating device 271, an address designating device 272, a function calling device 273, a determining device 274, and an argument setting device 275. These functions are main functions exerted by the CPU 210 through the system program of the robot S or application programs created by a user. The system control unit 211, the operation control unit 212, the file system unit 213, and the I/O control unit 214 of the main CPU 210 may exert the functions of the devices of reference symbols 271 to 275 in cooperation with each other, or the system control unit 211 may mainly exert the functions of the devices of reference symbols 271 to 275.

A storing area in the memory 230 has a user space 231 and a kernel space 232. In the user space 231, for example, a user application (application program) UAP, that is created by a user herself/himself by using a program language such as C language and compiled, is stored.

The user application UAP is an application program to execute operation control of the robot body 300 on the basis of the function of the user application UAP. When, on the basis of an operation from the pendant 100, the user application UAP is loaded on a nonvolatile memory (not shown) and started, the user application UAP calls functions from an API library KLIB (will be described later) as needed. On the basis of the functions, a control command is transmitted to the servo motors 301 of the robot body 300 to control an operation of the robot body 300.

The operation control of the robot body is performed by using an API (Application Programming Interface: an assembly of functions) stored in the kernel space 232 of the memory 230. In the past, when a control program based on a dedicated language (so-called robot language) is designated by an operation of the pendant 100, the API in the kernel space 232 is called on the basis of the control program, and the control commands are transmitted to the robot body 300.

In contrast to this, in the embodiment, the operation of the robot body is controlled by using an application program using a versatile program language such as C language. According to this, there is no need to translate robot languages for each command, and fast processing speed, various operation controls, and easy coping with hardware can be achieved. Since the application program can be created by a user herself/himself, the embodiment can rapidly and simply cope with various operation controls advantageously.

In the past, in order to directly call an API in the kernel space 232, the application program is stored in the kernel space 232. However, in the configuration, when an area address of a storing area (data storing area) that stores an argument of the API is erroneously designated, the system software in the kernel space 232 is unnecessarily accessed, and a drawback may occur in the operation of the robot system.

In the embodiment, a user application (user application program) UAP is stored in the kernel space 232 of the memory 230, and the API in the kernel space 232 can be called while protecting important data in the kernel space 232.

In the user space 231, system software USYS on a user space and an API library ULIB on a user space are also stored. The API library ULIB is an assembly of functions that can be directly called by the user application UAP. A real time process (RTP) includes the user application UAP, the system software USYS, and the API library ULIB.

The kernel space 232 is an address space in the memory 230 in which the kernel of an operating system (OS) operates. The user space 231 and the kernel space 232 are structured in the memory 230 by the function of the main CPU 210.

System software KSYS on the kernel space is stored in the kernel space 232. In the kernel space 232, the API library KLIB on the kernel space is also stored. The API library KLIB is an assembly of functions like the API library ULIB. However, since the API library KLIB is stored in the kernel space, the API library KLIB cannot be directly called from the user application UAP. A kernel module includes system software KSYS and the API library KLIB.

The user application UAP can be created by, for example, a user herself/himself using C language. The user application UAP which is completed the compile process may be temporarily stored in the flash memory 400 by a PC. The flash memory 400 may be loaded in the memory slot 105 to store the user application UAP in the memory 230 of the controller 200.

The main CPU 210 functions as the storing area generating device 271. When the user application UAP is activated, the storing area generating device 271 generates a data storing area 234 in the user space 231. The data storing area 234 in the user space 231 cannot be generally referred from the kernel space 232.

The main CPU 210 functions as the address designating device 272. When the data storing area 234 is generated in the user space 231, the area address of the data storing area 234 is designated by the address designating device 272. The area address is designated by a basic I/O control 235. The basic I/O control 235 is a process used for making the data storing area 234 in the user space 231 capable of being referred temporarily from the kernel space 232, and making the user application in the user space 231 capable of calling the API in the kernel space 232.

The main CPU 210 functions as the function calling device 273. When an area address is set in the basic I/O control 235, on the basis of the function of the main CPU 210 serving as the function calling device 273, the basic I/O control 235 accesses the API library KLIB in the kernel space 232. An API (function) designated by the user application UAP is called from the API library KLIB.

On the basis of the function of the system software KSYS on the kernel space 232, the main CPU 210 functions as the determining device 274. The determining device 274 determines whether the area address designated by the basic I/O control 235 that accesses the kernel space 232 designates an address in the user space 231. More specifically, the determining device 274 determines whether data storing area 234 set by the basic I/O control 235 is included in the user space 231.

As a result, when the data storing area 234 is included in the user space 231, as an argument of the function called by the basic I/O control 235, the area address of the data storing area 234 is set.

After the data storing area 234 is included in the user space 231, a function in the API library KLIB is executed. Therefore, an unexpected operation of the system software caused by an error such as an address violation, overwriting of data, or the like is effectively prevented to make it possible to assure security in execution of the user application.

In the above description, as a specific memory space that generates the data storing area 234, the user space 231 is exemplified. However, the specific memory area may be a common memory 233 different from memory 230 or the common memory 233 using a part of the memory 230. FIGS. 2 and 3 show examples in which common memories 233 different from the memory 230 are used as specific memory spaces. Since a function is executed after the data storing area 234 is included in the common memory 233, the kernel space 232 and the user space 231 can be prevented from being unexpectedly accessed to make it possible to protect the spaces.

A data processing procedure in the memory in the robot S will be described below with reference to a flow chart in FIG. 4. In the following flow chart, an example in which the data storing area 234 is not generated in the common memory 233 but in the user space 231 of the memory 230 will be described.

A user creates the user application UAP to perform a series of operation controls of the robot S by the PC in advance, and stores the user application UAP in the flash memory 400. The flash memory 400 is loaded in the memory slot 105 of the pendant 100, and the user application UAP is stored in the user space 231 in the memory 230 of the controller 200.

When, on the basis of an operation of the pendant 100 by the user, the user application UAP is activated by being loaded on a nonvolatile memory (not shown), the data storing area 234 is generated in the user space 231 (S1). An area address of the data storing area 234 is designated to the basic I/O control 235 (S2), and the basic I/O control 235 calls the API in the kernel space 232 (S3). In this case, processing in the user space 231 is given with a privileged mode by an OS to make it possible to access resources in the kernel space 232 (S4).

On the kernel space 232, it is determined whether the data storing area 234 is included in the user space 231 (S5). When, as the determination result, it is determined that the data storing area 234 is included in the user space 231, the area address of the data storing area 234 is given to the API as an argument (S6). Data (stored data) in the data storing area 234 is read by the API on the kernel space 232, and the API is executed by using the stored data (S7). A calculated value serving as a result of the executed operation is stored in the data storing area 234 again (S7).

In this case, the privileged mode ends, and the resources in the user space 231 and the resources in the kernel space 232 cannot be accessed to each other (S8). The user application UAP refers to the calculation result stored in the data storing area 234 (S9). In (S5), when it is determined as the result that the data storing area 234 is not included in the user space 231, error handling is executed (S10). The error handling may be processing that returns, for example, an error code that designates an "address exception handling error" to the user application UAP on the user space 231.

In this manner, the data storing area 234 can be avoided from being set in the kernel space 232. As a result, the backbone portion such as the system software KSYS in the kernel space 232 of the robot system can be advantageously protected.

The embodiment of the present invention has been described above. However, the present invention is not limited to the embodiment, and various changes and modifications can be effected without departing from the spirit and scope of the invention.

Obviously, numerous modifications and variations of the present invention are possible in light of the above teachings. It is therefore to be understood that within the scope of the appended claims, the invention may be practiced otherwise than as specifically described herein.

What is claimed is:

1. A data processing method comprising:
generating a data storing area in a memory space;
designating an area address of the data storing area to a basic I/O control on a user space in a memory having the user space and a kernel space;
calling a function in the kernel space using the basic I/O control;

determining whether the data storing area is inside the user space of the memory; and setting the area address of the data storing area as an argument of the function in a case where it is determined that the data storing area is included in the user space, wherein at least one step is performed by a processor.

2. The data processing method according to claim 1, wherein the memory space is inside the user space of the memory.

3. The data processing method according to claim 1, wherein the memory space is set in a common memory.

4. The data processing method according to claim 1, further comprising:

writing a result of an operation on the function into the data storing area.

5. The data processing method according to claim 1, further comprising:

executing error processing without setting the area address of the data storing area as the argument of the function in a case where it is determined that the data storing area is not included in the user space.

6. The data processing method according to claim 1, wherein the data storing area is generated in the memory space using a user application coded and compiled by C language.

7. A data processing apparatus comprising:

a storing area generating device configured to generate a data storing area in a memory space;

an address designating device configured to designate an area address of the data storing area to a basic I/O control on a user space in a memory having the user space and a kernel space;

a function calling device configured to call a function in the kernel space using the basic I/O control;

a determining device configured to determine whether the data storing area is inside the user space of the memory; and an argument setting device configured to set the area address of the data storing area as an argument of the function in a case where it is determined that the data storing area is included in the user space.

8. The data processing apparatus according to claim 7, wherein the memory space is inside the user space of the memory.

9. The data processing apparatus according to claim 7, wherein the memory space is set in a common memory.

10. The data processing apparatus according to claim 7, further comprising:

a writing device configured to write a result of an operation on the function into the data storing area.

11. The data processing apparatus according to claim 7, further comprising:

an error processing device configured to execute error processing without setting the area address of the data storing area as the argument of the function in a case where it is determined that the data storing area is not included in the user space.

12. A robot comprising:

a robot body comprising a plurality of hinges and a plurality of drive motors to drive the plurality of hinges;

an input apparatus including an operation device configured to accept an input of an operation designation to operate the robot body; and a controller including a data processing apparatus comprising:

a storing area generating device configured to generate a data storing area in a memory space;

an address designating device configured to designate an area address of the data storing area to a basic I/O control on a user space in a memory having the user space and a kernel space;

a function calling device configured to call a function in the kernel space using the basic I/O control;

a determining device configured to determine whether the data storing area is inside the user space of the memory; and an argument setting device configured to set the area address of the data storing area as an argument of the function in a case where it is determined that the data storing area is included in the user space.

13. The robot according to claim 12, further comprising:

an error processing device configured to execute error processing without setting the area address of the data storing area as the argument of the function in a case where it is determined that the data storing area is not included in the user space.

* * * * *